United States Patent
Chan

(10) Patent No.: US 8,412,288 B2
(45) Date of Patent: Apr. 2, 2013

(54) OPTIMIZATION OF POWER CONSERVATION WITH RESPECT TO APPLICATION REQUIREMENTS

(75) Inventor: H. Anthony Chan, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 778 days.

(21) Appl. No.: 12/549,073

(22) Filed: Aug. 27, 2009

(65) Prior Publication Data

US 2010/0056230 A1 Mar. 4, 2010

Related U.S. Application Data

(60) Provisional application No. 61/093,999, filed on Sep. 3, 2008.

(51) Int. Cl.
*H04B 1/38* (2006.01)
(52) U.S. Cl. .................. 455/574; 455/552.1; 455/556.1; 455/557
(58) Field of Classification Search .................. 455/574, 455/572, 556.1, 557, 552.1
See application file for complete search history.

(56) References Cited

U.S. PATENT DOCUMENTS

| | | | |
|---|---|---|---|
| 6,212,398 | B1 | 4/2001 | Roberts et al. |
| 7,266,389 | B2 * | 9/2007 | Karaoguz et al. .......... 455/556.1 |
| 7,512,423 | B2 * | 3/2009 | Karaoguz ...................... 455/574 |
| 2004/0029621 | A1 * | 2/2004 | Karaoguz et al. ............. 455/574 |
| 2004/0153676 | A1 | 8/2004 | Krantz |
| 2005/0190709 | A1 | 9/2005 | Ferchland et al. |
| 2005/0190714 | A1 | 9/2005 | Gorbatov |
| 2005/0201291 | A1 | 9/2005 | Gluck |
| 2005/0261038 | A1 | 11/2005 | Chary |
| 2007/0104179 | A1 | 5/2007 | Srinivasan et al. |
| 2007/0281641 | A1 | 12/2007 | Kim et al. |
| 2008/0151800 | A1 | 6/2008 | Rofougaran |
| 2008/0165716 | A1 | 7/2008 | Choi et al. |
| 2011/0111708 | A1 * | 5/2011 | Tu et al. .......................... 455/82 |

FOREIGN PATENT DOCUMENTS

CN    1519680 A    8/2004

OTHER PUBLICATIONS

"IEEE Standard for Information Technology—Telecommunications and Information Exchange Between Systems—Local and Metropolitan Area Networks—Specific Requirements, Part 11: Wireless LAN Medium Access Control (MAC) and Physical Layer (PHY) Specifications," IEEE Computer Society, IEEE 802.11-2007, Jun. 2007.
"IEEE Recommended Practice for Local and Metropolitan Area Networks—Coexistence of Fixed Broadband Wireless Access Systems," IEEE Computer Society and the IEEE Microwave Theory and Techniques Society, IEEE 802.16.2-2004, Mar. 2004.
"IEEE Standard for Local and Metropolitan Area Networks—Part 21: Media Independent Handover Services," IEEE Computer Society, IEEE 802.21-2008, Jan. 2009.

(Continued)

*Primary Examiner* — Temica M Beamer
(74) *Attorney, Agent, or Firm* — Conley Rose, P.C.; Grant Rodolph; Clint Wilkins

(57) ABSTRACT

An apparatus comprising a power supply, a first interface coupled to the power supply and associated with a first operational mode and a second operational mode, and a second interface coupled to the power supply and associated with a third operational mode, wherein the wireless device is associated with an application having a response time requirement, wherein the first operational mode does not meets the response time requirement via the first interface, wherein the second operational mode meets the response time requirement via the first interface, wherein the third operational mode meets the response time requirement via the second interface, and wherein the apparatus is configured to consume less power using the first operational mode and the third operational mode than when using the second operational mode.

26 Claims, 6 Drawing Sheets

OTHER PUBLICATIONS

Foreign Communication From A Related Counterpart Application, PCT Application PCT/CN2009/073678, International Search Report dated Dec. 10, 2009, 6 pages.

Foreign Communication From A Related Counterpart Application, PCT Application PCT/CN2009/073678, Written opinion dated Dec. 10, 2009, 4 pages.

* cited by examiner

OPTIMIZATION OF POWER CONSERVATION WITH RESPECT TO APPLICATION REQUIREMENTS

CROSS-REFERENCE TO RELATED APPLICATIONS

The present application claims priority to U.S. Provisional Patent Application 61/093,999, filed Sep. 3, 2008 by H. Anthony Chan and entitled "Method to Optimize Power Conservation with Respect to Application Requirements," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In wireless communication systems, some wireless devices may have multiple interfaces, for example based on different wireless technologies or standards. Further, some wireless devices can conserve battery power by selecting different operational modes. Typically, such wireless devices can conserve power by employing different operational modes for each interface, such as active, standby, sleep, and off. However, the operational modes that conserve more power typically have longer response times than operational modes that conserve less power. In any event, there is usually an inverse relationship between accessibility and power consumption for any wireless application. As such, the operational modes that conserve more power allow less access to applications than operational modes that conserve less power. Therefore, a compromise exists between meeting the response time required by an application and reducing the power used by the wireless device.

SUMMARY

In one embodiment, the disclosure includes an apparatus comprising a power supply, a first interface coupled to the power supply and associated with a first operational mode and a second operational mode, and a second interface coupled to the power supply and associated with a third operational mode, wherein the wireless device is associated with an application having a response time requirement, wherein the first operational mode does not meets the response time requirement via the first interface, wherein the second operational mode meets the response time requirement via the first interface, wherein the third operational mode meets the response time requirement via the second interface, and wherein the apparatus is configured to consume less power using the first operational mode and the third operational mode than when using the second operational mode.

In another embodiment, the disclosure includes an apparatus comprising at least one processor configured to implement a method comprising associating a plurality of operational modes for a plurality of interfaces with a plurality of applications supported by the interfaces based on the response times associated with the operational modes and the applications, receiving a request to initialize a first one of the applications via a first one of the interfaces, and selecting, for the first interface, a first one of the operational modes that is associated with the first application and that has less response time and consumes less power than at least some of the other operational modes associated with the first application.

In yet another embodiment, the disclosure includes a method comprising determining a state for wireless device having a first interface associated with a first operational mode and a second operational mode, and a third operational mode associated with a second interface, wherein the wireless device is associated with an application having a response time requirement, wherein the first operational mode does not meets the response time requirement via the first interface, wherein the second operational mode meets the response time requirement via the first interface, wherein the third operational mode meets the response time requirement via the second interface, wherein the apparatus is configured to use the first operational mode and the third operational mode without using the second operational mode.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a system and method to configure a plurality of operational modes for a plurality of interfaces on a wireless device. Each operational mode for each interface may be selected to meet any application requirements, such as the application required response time, while reducing the power consumed by the wireless device. Specifically, a wireless network may obtain information about a plurality of operational modes supported by the wireless device and about a plurality of applications, which may be initiated over the interfaces on the wireless device. The network may then use this information to select an operational mode over each interface, which may improve power conservation for the wireless device. Additionally, the selected operational modes may meet the response times required by the applications over the corresponding interfaces. The obtained information may also be used by the wireless network to determine how to handle an application request, such as an incoming call, which may be initiated over one of the interfaces on the wireless device using a selected operational mode.

Figure 1:
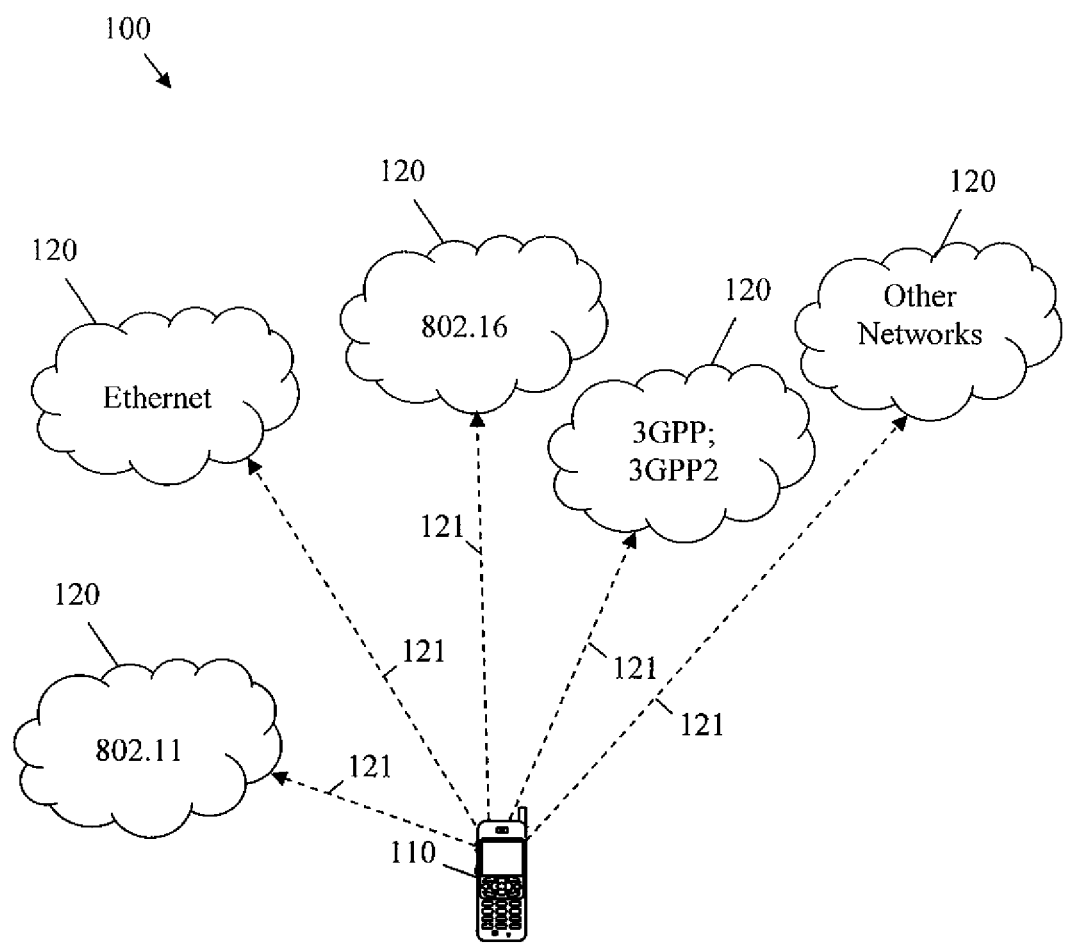
FIG. 1 is a schematic diagram of an embodiment of a network access system.

FIG. 1 illustrates one embodiment of a network access system 100, which may comprise a user equipment (UE) 110, a plurality of access networks 120, and a plurality of interfaces 121 between the UE 110 and the access networks 120. The UE 110 may be any user mobile device, component, or apparatus that communicates with the access networks 120 via the interfaces 121. For example, the UE 110 may be a mobile phone, a personal digital assistant (PDA), a portable computer, or any other wireless device. The UE 110 may comprise a power supply, such as a battery, and a plurality of radios, which may be configured to exchange wireless signals with the access networks 120 via the interfaces 121. For example, the UE 110 may comprise a plurality of radio frequency (RF) transceivers, infrared transceivers, and/or any other wireless communication systems that enables the UE 110 to communicate wirelessly with the access networks 120. Additionally, the UE 110 may comprise an input/output (I/O) device or I/O ports, which may be configured for coding and decoding signals into user-accessible data, such as voice, text, video, etc. In some embodiments, the UE 110 may use a fixed, e.g. optical or electrical, link to communicate with one of the access networks 120.

The access networks 120 may be any type of network that exchanges data with the UE 110 using the wireless interface 121. For instance, the access networks 120 may comprise an Institute for Electrical and Electronic Engineers (IEEE) 802.11 network, a wireless Ethernet network, an IEEE 802.16 network, a Universal Mobile Telecommunications System (UMTS) network, a 3rd Generation Partnership Project (3GPP) network, a 3GPP2 network, or any other wireless network. In some embodiments, the access networks 120 may comprise any other network, such as a Packet Switched Network (PSN), the Internet, a local area network (LAN), an IEEE 802.3 Ethernet network, a digital subscriber line (DSL), etc. Some or all of the access networks 120 may be configured to communication with one another, for example via the Internet.

In an embodiment, the UE 110 and/or the access network 120 may comprise or may be coupled to an information system (IS), which may be located in a database or at a server. The IS may comprise information about the operational modes and the applications supported over the interfaces 121. Specifically, the IS may comprise a list of possible applications that may be supported according to the capability of the UE 110 and the interface 121. For example, the interface 121 may support conventional voice applications (e.g. cellular telephone service), push-to-talk voice applications, packet data applications (e.g. email or browser packets), streaming data applications (e.g. streaming or bi-directional audio/video), or any other application. Additionally or alternatively, the IS may comprise a list of possible applications that may be supported according to the subscription profile of UE 110. For example, the UE 110 may have a Global System for Mobile communications (GSM) subscription that may not include UMTS services. The IS may also comprise the application required response time for different applications supported for the interfaces 121. For example, the IS may comprise the required response time to answer a phone call, the required response time of push-to-talk, etc. As such, the IS may correlate the operational modes, applications, and required response time used for each interface 121.

The interfaces 121 may be wireless or radio link interfaces, such as point-to-point (PTP) links, which may provide wireless communication channels between the UE 110 and the access networks 120. For instance, the interfaces 121 may be Code Division Multiple Access (CDMA), Orthogonal Frequency-Division Multiple Access (OFDMA), Time Division Multiple Access (TDMA), Frequency-Hopping Spread Spectrum (FHSS), Infrared Data Association (IrDA), or combinations thereof. In some embodiments, the interfaces 121 may comprise an IEEE 802.11 standard interface, a 3GPP standard interface, a 3GPP2 standard interface, a Bluetooth interface, other wireless technology interfaces, or combinations thereof. In some embodiments, the interfaces 121 may comprise a fixed link interface, e.g. an electrical or optical link interface.

The UE 110 may be configured to use a selected operational mode for each interface 121. An operational mode may be defined as a state of awareness for an interface 121. Each interface's 121 operational mode may have different power consumption characteristics, requirements, and/or response times. For instance, the operational modes may comprise active (e.g. in service) operational mode, and off operational mode, and various intermediate operational modes, such as power saving mode (PSM), extended PSM, sleep, and/or idle. The intermediate operational modes may have slower response times for initializing applications than the active operational mode. For example, the active operational mode's response time may be equal to about X unit of time, the sleep operational mode's response time may be equal to about 2X units of time, the deep sleep operational mode's response time may be equal to about 4X units of time, and the idle operational mode's response time may be equal to about 10X units of time. The intermediate operational modes may also have lower power consumption requirements than the active operational mode.

The UE 110 may establish operational modes for the interfaces 121, including different operational modes for interfaces 121, and each operational mode may have different power consumption requirements. With multiple interfaces, relatively few, e.g. one, interfaces may be kept in an operational mode with sufficiently fast response time to meet any of the UE's 110 response time requirements, while the remaining interfaces may be placed in the operational modes that may have relatively lower power consumption requirements, e.g. deep sleep, idle, or off operational mode. Such a configuration of operational modes may reduce the overall power consumption of the UE 110, and hence extend its battery lifetime. Such a configuration may also produce slower response times for initializing applications over the interfaces 121 that may be configured using lower power-consumption operational modes in comparison to faster response operational modes. However, the response time associated with the multiple interfaces 121 configured as described herein may be better than when these same interface are similarly and individually configured and established alone between the UE 110 and an access network 120, e.g. in single interface mode.

The applications may be initialized for the UE 110, for instance by the access network 120 and/or the UE 110, over the interface 121 configured using a selected operational mode. To successfully initialize the application, some application requirements, such as an application required response time, should be met. For instance, the operational mode response time used by the UE 110 should be shorter than or about equal to the application required response time. Otherwise, the application may be canceled or delayed, as described in more detail below. Therefore, selecting an operational mode for each interface 121, for instance based on its operational mode response time and the application required response time of an application initialized over the interface 121, may be useful to improve power conservation of the UE 110 and help ensure successful initialization of the applications over each interface 121.

Figure 2:
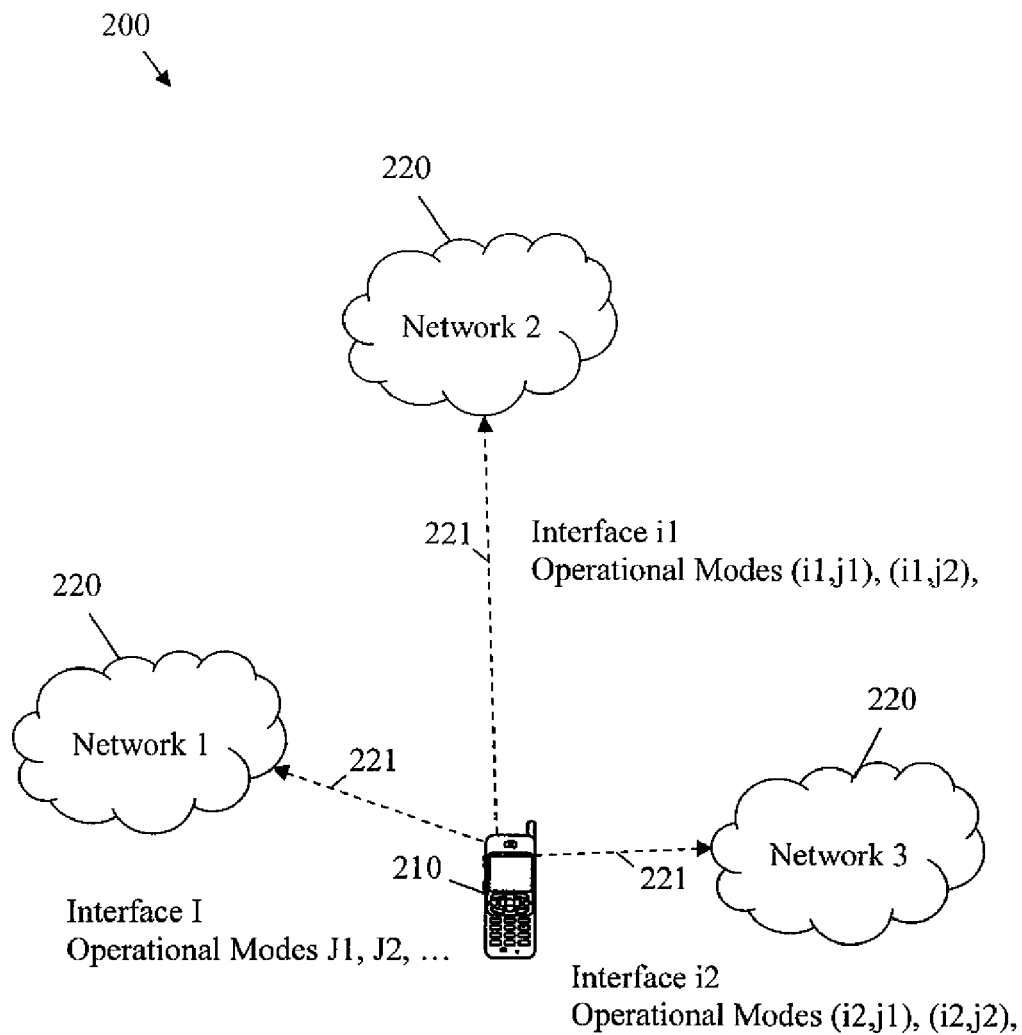
FIG. 2 is a schematic diagram of another embodiment of a network access system.

FIG. 2 illustrates one embodiment of a network access system 200. The network access system 200 may comprise a UE 210, a plurality of access networks 220, and a plurality of interfaces 221 between the UE 210 and the corresponding access networks 220. The UE 210, access networks 220, and interfaces 221 may be configured similar to the corresponding components of the network access system 100. For instance, the UE 210 may establish a primary interface I with one of the access networks 220, e.g. network 1, and a plurality of secondary interfaces i1 and i2 with other access networks 220, e.g. networks 2 and 3. Additionally, a plurality of operational modes may be configured for each established interface 221. One of the configured operational modes may then be selected to operate the corresponding interface 221. When configuring the interfaces 221, the primary interface I may be designated to listen for a page from the access network 220 for the primary interface I and on behalf of the secondary interfaces i1 and i2.

In an embodiment, the operational mode response time (T-response) may be defined as the sum of a page time (T-page) and a handshake time (T-handshake). Such a relationship may be expressed mathematically as:

$$T\text{-response} = T\text{-page} + T\text{-handshake}.$$

The page time may be about equal to the time needed for sending a message from a third-party to the UE 210 via the access network 220. The handshake time may be about equal to the time needed for the UE 210 to configure itself to send and/or receive data by the access network 220. Thus, the primary interface I may have a first handshake time (T0-handshake), and the secondary interfaces may each have a second handshake time (T1-handshake) associated with the primary interface. Stated differently, in the case of a single established primary interface using a J-th operational mode, the J-th operational mode response time (T-response(I,J)) may be about equal to the sum of the page time (T-page(I,J)) of interface I using the J-th operational mode and the corresponding handshake time (T0-handshake(I,J)) of interface I. Such a relationship may be expressed mathematically as:

$$T\text{-response}(I,J) = T\text{-page}(I,J) + T0\text{-handshake}(I,J).$$

In the case of multiple established interfaces using multiple operational modes, an operational mode response time (T-response(I,J,i,j)) of a secondary interface (interface i) using a j-th operational mode and paged via interface I using the J-th operational mode may be about equal to the sum of T-page(I, J) and the second handshake time (T1-handshake(I,J,i,j)) when the UE 210 is paged via the primary interface I. Such a relationship may be expressed mathematically as:

$$T\text{-response}(I,J,i,j) = T\text{-page}(I,J) + T1\text{-handshake}(I,J,i,j).$$

The above relationship may be simplified by estimating T-response(I,J,i,j) as the sum of T-page(I,J) and a second handshake time (T1-handshake(i,j)) when the UE 210 is paged via the second interface i. In such a case, the relationship may be expressed mathematically as:

$$T\text{-response}(I,J,i,j) = T\text{-page}(I,J) + T1\text{-handshake}(i,j).$$

In an embodiment, the UE 210 and/or the access network 220 may maintain an application table and/or an operational mode table, for example in the IS. The application table may comprise information about the applications that may be supported for the UE 210 via the interfaces 221. The operational mode table may comprise information about the operational modes configured for the UE 210 for each interface 221. The operational mode table may also associate the operational modes with the applications for each of the interfaces 221, for instance based on the response times of the operational modes and the response times of the applications.

Table 1 shows an embodiment of an application table that may be associated with the operational modes for the UE 210. The application table may comprise a plurality of applications for the UE 210 (e.g. appl-1, appl-2, appl-3, appl-4, appl-5, and appl-6) and a plurality of relationships between their response times (e.g. T(appl-1)T(appl-2), T(appl-3)≈T(appl-4), and T(appl-5)≈T(appl-6)). Additionally, the application table may comprise a plurality of application categories (e.g. A1, A2, and A3), their associated response times (e.g. T(A1), T(A2), and T(A3)), and the relationship between their associated response time (e.g. T(A1)<T(A2) and T(A2)<T(A3)). In an embodiment, the access network 220 may obtain the information in Table 1 from the nodes that send the application requests to the UE 210. The application table may be maintained at one or more of the access networks 220 and/or at the UE 210, for example in the IS.

TABLE 1

| | Applications | | |
|---|---|---|---|
| | appl-1, appl-2 | appl-3, appl-4 | appl-5, appl-6 |
| Application Response Times | T(appl-1) ≈ T(appl-2) | T(appl-3) ≈ T(appl-4) | T(appl-5) ≈ T(appl-6) |
| Application Categories | A1 | A2 | A3 |
| Relationship Between Application Response Times | T(A1) < T(A2) | T(A2) < T(A3) | T(A3) |

The applications for the UE 210 may be grouped into the application categories according to the relationships between their response times. For example, each of a first plurality of applications (e.g. appl-1 and appl-2), a second plurality of applications (e.g. appl-3 and appl-4), and a third plurality of applications (e.g. appl-5 and appl-6) may have about equal response times. Thus, the first plurality of applications may be grouped into the first application category (e.g. A1), the second plurality of applications may be grouped into the second application category (e.g. A2), and the third plurality of applications may be grouped into the third application category (e.g. A3). The resulting application categories may also be related to one another based on the relationships between their applications response times. For example, since appl-1 and appl-2 may have shorter application response times than appl-3 and appl-4, the application required response time for A1 (T(A1)) may be less than the application response time for A2 (T(A2). Similarly, the application required response time for A2 (T(A2)) may be less than the application response time for A3 (T(A3)). Such relationships may be included in the application table as shown in Table 1.

Table 2 shows an embodiment of an operational mode table that may be associated with the information in the application table, e.g. of Table 1. The operational mode table may comprise the application categories from the application table (e.g. A1, A2, and A3), their response times (e.g. T(A1), T(A2), and T(A3)), a plurality of operational modes for the UE 210 (e.g. J1, J2, and J3), and the relationship between the operational mode and application response times (e.g. T-response(I,J1)≦T(A1), T-response(I,J2)≦T(A2), and T-response(I,J3)≦T(A3)). The access network 220 may obtain the information in Table 2 from the UE 210. The operational mode table may be maintained at one or more of the access networks 220 and/or at the UE 210, for example in the IS.

Table 3 shows an embodiment of a combined application and operational mode table, which may be used to select an operational mode J for the primary interface I. The combined application and operational mode table may be maintained at the access network 220 and/or the UE 210, e.g. in the IS. The combined application and operational mode table may comprise a plurality of application categories (e.g. A1, A2, and

TABLE 2

| | Application Categories | | |
|---|---|---|---|
| | A1 | A2 | A3 |
| Application Response Times | T(A1) | T(A2) | T(A3) |
| Operational Modes | J1 | J2 | J3 |
| Operational Mode and Application Response Times | T-response(I, J1) ≦ T(A1) | T-response(I, J2) ≦ T(A2) | T-response(I, J3) ≦ T(A3) |

The operational modes for the UE 210 may be associated with the application categories if the operational modes meet the response times required by the applications. For instance, the operational modes may be associated with the application categories according to the relationships between the response times of the operational modes and the response times of the applications (e.g. T-response(I,J1)≦T(A1)), T-response(I,J2)≦T(A2), and T-response(I, J3)≦T(A3)). The relationships between the response times of the operational modes and the applications may be obtained from the UE 210. For example, the first operational mode J1 may be associated with the first application category A1 since J1 has a response time less than or about equal to the response time of A1, and therefore may meet the time requirement for A1. Similarly, the second operational mode J2 may be associated with the second application category A2, and the third operational mode J3 may be associated with third application category A3.

In an embodiment, the primary interface I may be configured to listen, on behalf of all the established interfaces, for a page or any request to initialize an application. The UE 210 may select and use a plurality of operational modes (e.g. J1, J2, J3, ...) for the primary interface I, for instance which may meet the response times of the application categories in Table 1 and Table 2. Alternatively, the access network 220 may configure the operational modes for the UE 210 based on the same criteria. For example, the first operational mode J1 for the primary interface I may have an operational mode response time about equal to or less than the application required response time of the first application category A1, e.g. T-response(I,J1)≦T(A1). Similarly, the second operational mode J2 may meet the application required response time of the second application category A2, e.g. T-response (I,J2)≦T(A2), etc.

A3), their response times (e.g. T(A1), T(A2), and T(A3)), the primary interface associated with each application category and corresponding operational mode, and the operational modes (e.g. J1, J2, and J3) that meet the response times of the application categories. The combined application and operational mode table may also comprise the relationships between the response times of the applications and the operational modes (e.g. T-response(I,J1)≦T(A1), T-response(I,J2) ≦T(A2), and T-response(I,J3)≦T(A3)). The information in the combined application and operational mode table may be obtained from the application table and/or the operational mode table or similarly. The combined application and operational mode table may be maintained at one or more of the access networks 220 and/or at the UE 210, for example in the IS.

TABLE 3

| | Application Categories | | |
|---|---|---|---|
| | A1 | A2 | A3 |
| Application Response Times | T(A1) | T(A2) | T(A3) |
| Primary Interface | I | I | I |
| Operational Modes | J = J1 | J2 | J3 |
| Operational Mode and Application Response Times | T-response(I, J) ≦ T(A1) | T-response(I, J2) ≦ T(A2) | T-response(I, J3) ≦ T(A3) |

In an embodiment, the primary interface I may be selected based on the power consumption requirements of the UE 210, network availability, and/or the applications needed and their response times. For instance, the UE 210 may use an optimization algorithm or method to choose one of a plurality of available interfaces, which may have the least power consumption requirement and/or may be already in a communication session. The operational mode J for the primary interface I may then be selected using the combined application and operational mode table and based on the expected applications for the UE 210. For example, if no applications are requested for the UE 210 in the first application category A1, the second operational mode J2 associated with the second application category A2 may be selected for the UE 210. Although both J1 and J2 meet the response times for A2, J2 may have lower power consumption requirements than J1 and therefore selecting J2 may save more battery power.

Figure 3:
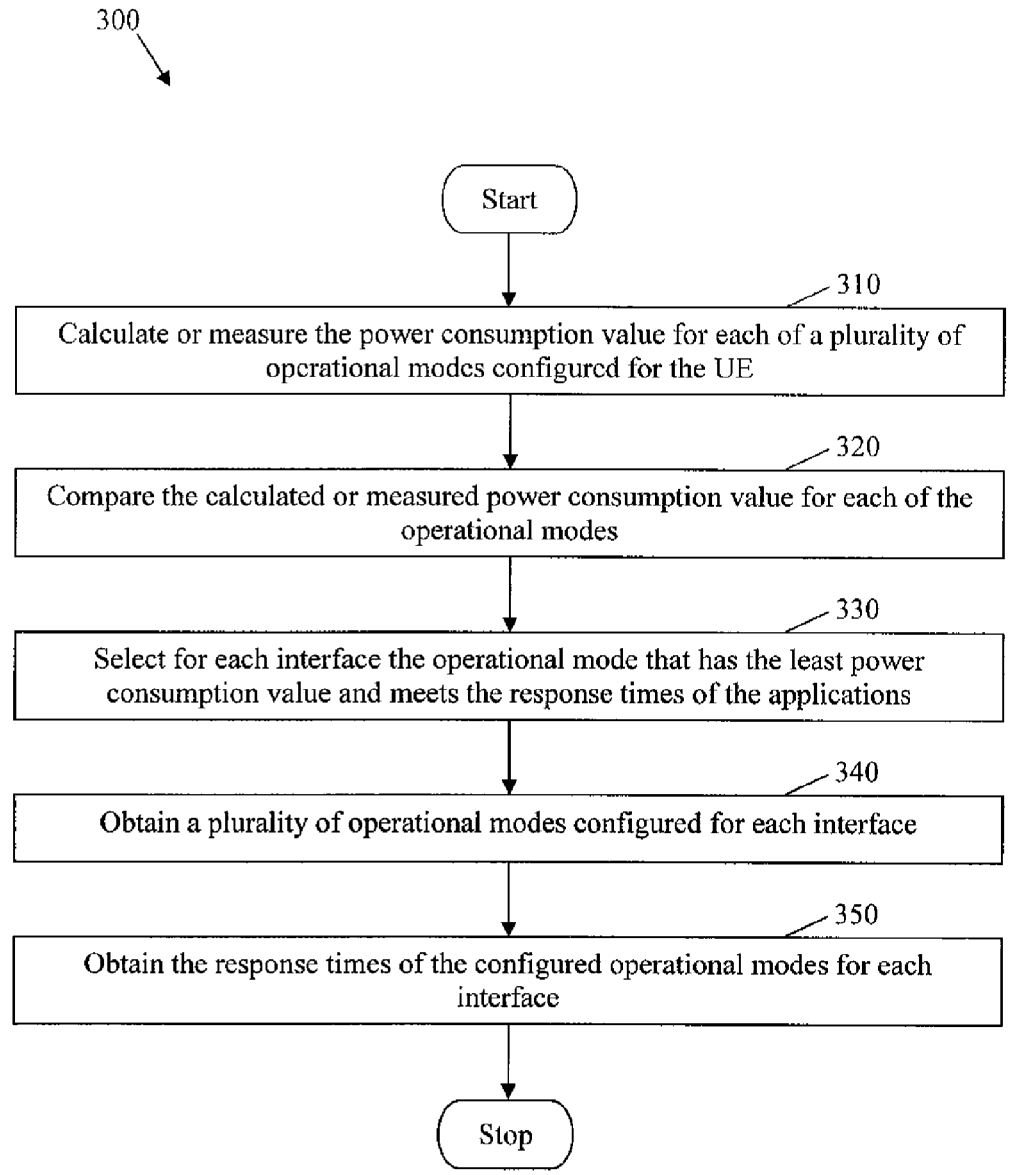
FIG. 3 is a flowchart of an embodiment of an operational mode selection method.

FIG. 3 illustrates an embodiment of an operational mode selection method 300, which may be used to select the operational modes for at least one secondary interface i after selecting an operational mode J for the primary interface I. Specifically, the operational modes may be selected to reduce power consumption requirements of the UE, e.g. UE 210, while meeting the applications' response times. The method 300 may begin at block 310, where the power consumption value for each of a plurality of operational modes that may be configured for the UE may be calculated or measured. For example, the network may obtain the power consumption value for each of the operational modes (e.g. j1, j2, and j3), which may meet the response times for different application categories. The operational modes may be associated with the primary interface I and each secondary interface i in a combined application and operational mode table, which may be used to select a list of operational modes for the primary and secondary interfaces.

Table 4 shows an embodiment of an expanded application and operational mode table, which may associate the operational modes with a plurality of interfaces of the UE. The information in Table 4 may be obtained and maintained similarly to the information in Table 3. For instance, the expanded application and operational mode table may comprise the application categories (e.g. A1, A2, and A3), their response times, the primary interface associated with each application category and corresponding operational mode, the secondary interface associated with each application category and corresponding operational mode, and the operational modes for each interface that meet the response times of the application categories. The expanded application and operational mode table may also comprise the relationships between the response times of the applications and the operational modes for each interface. The response time of the operational mode for a secondary interface i may be approximated by the response time of the operational mode for the primary interface I, e.g. T-response(I,J,i,j1)≈T-response(I,J). Additionally or alternatively, the response time of the operational mode for the secondary interface i may be related to the response times of the applications, e.g. T-response(I,J,i,j2)≦T(A2) and T-response(I,J,i,j3)≦T(A3). In some embodiments, after selecting the primary interface I, any remaining secondary interfaces (e.g. i1, i2, and i3) may be considered based on the applications needed or requested via each interface.

tional modes and hence select the operational mode that has the least power consumption value and meets the response times of the applications.

In some embodiments, the method 300 may end after block 330. In other embodiments, the method 300 may then proceed to block 340, where a plurality of operational modes configured for each interface may be obtained, for instance from the expanded application and operational mode table. Alternatively, the UE may send the list of configured operational modes to the access network (or vice-versa). The method 300 may then proceed to block 350, where the response times of the operational modes for each interface may be obtained. Subsequently, the access network may use such information to decide on how to handle a call or an application request for the UE.

In an embodiment, the UE may initially establish a single primary interface I with the access network, and may operate the primary interface I in operational mode J, which may reduce power consumption for the UE. The operational mode J may be selected to meet the response time for any applications that may be needed or requested by the UE. The UE may then inform the access network of the selected operational mode J and/or interface I. Subsequently, the access network may use the application table, operational mode table, combined application and operational mode table, and/or expanded application and operational mode table to obtain the response time of the operational mode J, the application categories that are associated with the operational mode J, and the applications that belong to the application categories and that meet the response time of operational mode J. The access network may use such information associated with the operational mode J to decide on how to handle any application requests for the UE.

Figure 4:
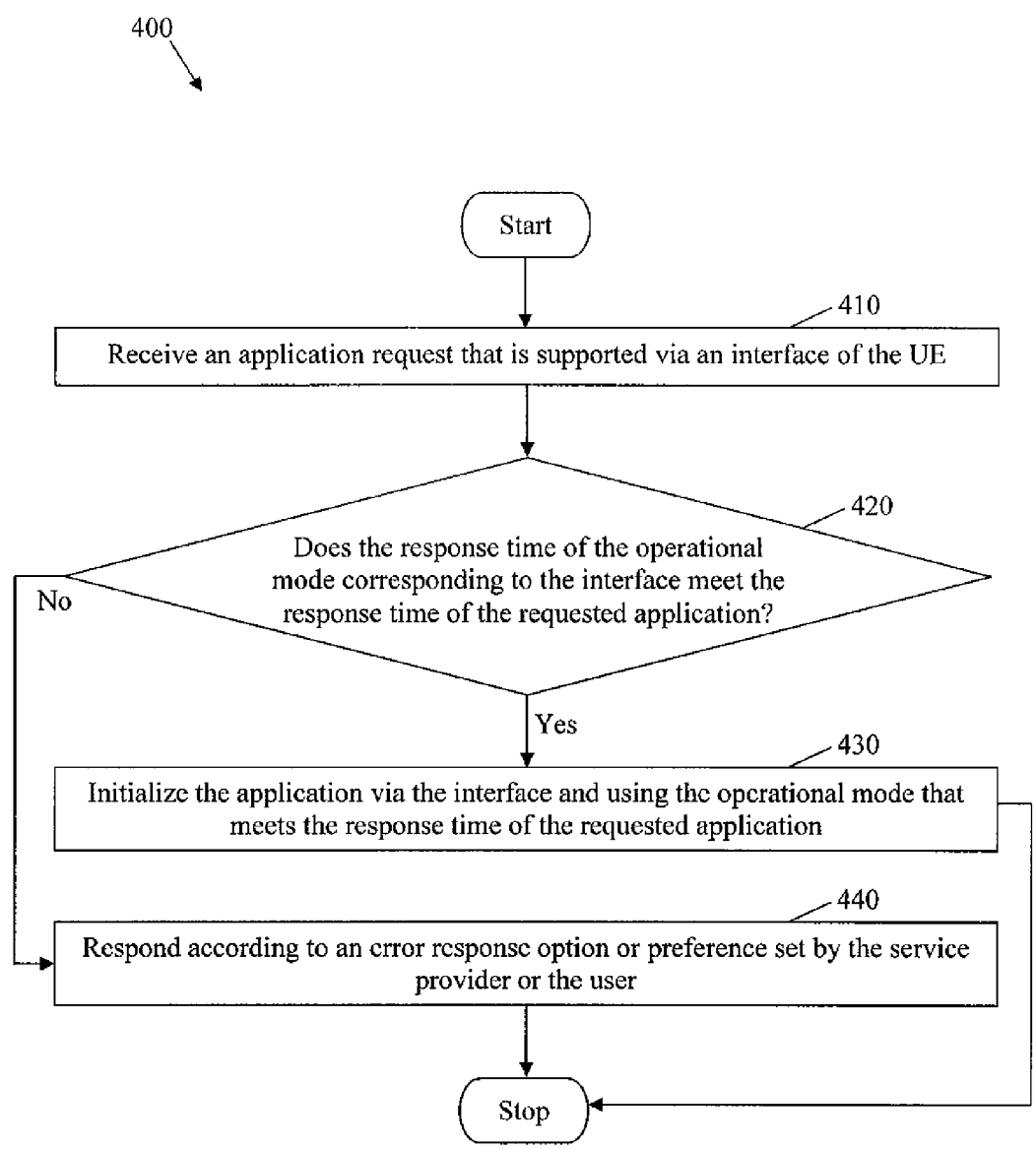
FIG. 4 is a flowchart of an embodiment of an application request handling method.

FIG. 4 illustrates an embodiment of an application request handling method 400, which may be used by the access network to handle an application request for the UE. The method 400 may begin at block 410, where an application request, which may be supported via an interface of the UE, may be received. For instance, the access network may receive an application request for an application that may be

TABLE 4

|  | Application Categories | | |
| --- | --- | --- | --- |
|  | A1 | A2 | A3 |
| Application Response Times | T(A1) | T(A2) | T(A3) |
| Primary Interface | I | I | I |
| Operational Modes | J = J1 | J2 | J3 |
| Operational Mode and Application Response Times | T-response(I, J) ≦ T(A1) | T-response(I, J2) ≦ T(A2) | T-response(I, J3) ≦ T(A3) |
| Secondary Interface | i | i | i |
| Operational Modes | j1 | j2 | j3 |
| Operational Mode and Application Response Times | T-response(I, J, i, j1) ≈ T-response(I, J) | T-response(I, J, i, j2) ≦ T(A2) | T-response(I, J, i, j3) ≦ T(A3) |

Returning to the method 300, at block 320 the calculated or measured power consumption value for each of the operational modes may be compared. Next, at block 330 the operational mode that has the least power value and meets the response times of the applications may be selected for each interface. For instance, the access network may configure the UE to operate the secondary interface i using the selected operational mode. Alternatively, the UE may obtain the calculated or measured power consumption values for the operasupported via the primary interface I. Alternatively, the access network may receive an application request for an application that may be supported via the secondary interface i. In some embodiments, the received application request may be supported over a plurality of secondary interfaces (e.g. i1, i2, and i3) or by the primary interface I and a plurality of secondary interfaces.

The method 400 may then proceed to block 420, where a determination may be made as to whether the response time of the operational mode associated with the interface meets the response time of the requested application. The access network may obtain the response time of the application and the response time of the operational mode, e.g. from the application and/or operational mode table. For example, the access network may determine whether the response T-response(I,J), which may correspond to the operational mode J for the primary interface I, is less than or about equal to the response time T(appl) of the application. Alternatively, the access network may determine whether the response time T-response(I,J,i,j), which may correspond to the operational mode j for the secondary interface i, is less than or about equal to the response time T(appl) of the application. In some cases, the requested application may be supported via any of a plurality of secondary interfaces. Hence, the access network may determine whether the response time of the operational mode for any of the secondary interfaces is less than or about equal to the response time of the application. If the application's response time is greater than the operational mode's response time, then the operational mode may meet the application's time requirement. Otherwise, the operational mode may not meet the application's time requirement.

The method 400 may proceed to block 430 when the condition in block 420 is met. At block 430, the application may be initialized, for instance by the access network, via the interface that supports the application and using the operational mode that meets the response time of the requested application. Alternatively, if the condition in block 420 is not met the method 400 may proceed to block 440. At block 440, a response may be made according to an error response option or preference, which may be set by the service provider or the user. For instance, the access network may send an error message to a third-party node that requested the application. Alternatively, the access network may send a message to the third-party node to wait while the access network pages the UE, or the access network may drop the application request and request the third-party node to resend the application request at a later time.

Figure 5:
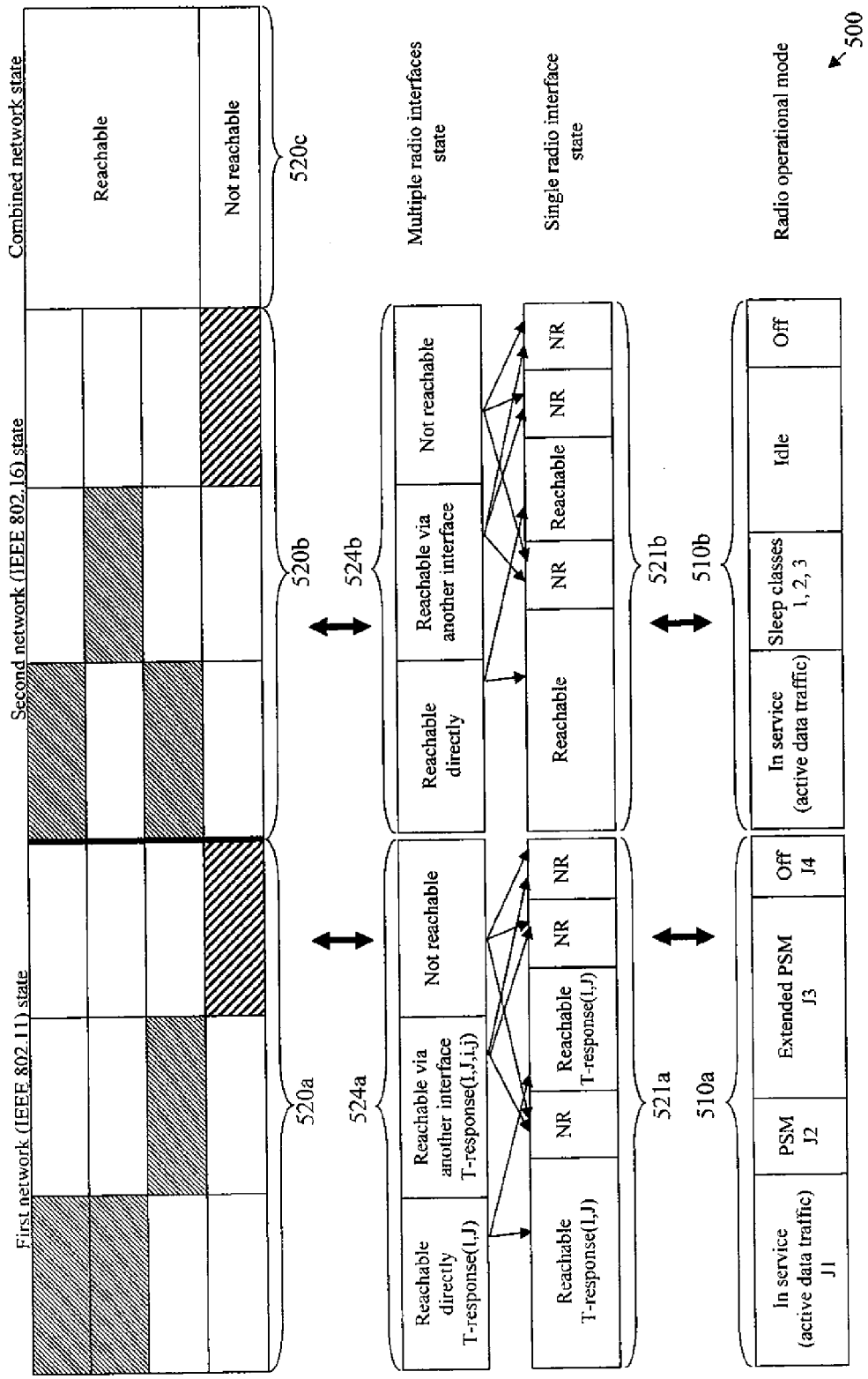
FIG. 5 is a schematic diagram of an embodiment of a network access system state diagram.

FIG. 5 illustrates an embodiment of a network access system state diagram 500, which may correspond to the network access system 100 or the network access system 200. The network access system state diagram 500 may comprise a UE, a first access network, a second access network, a first interface between the UE and the first access network, and second interface between the UE and the second access network. The UE may comprise a first radio configured to communicate with the first access network via the first interface and a second radio configured to communicate with the second access network via the second interface. The network access system state diagram 500 indicates the state of the UE to the network access system and to each access network via each interface.

The network access system state diagram 500 may comprise a first radio operational mode 510a that corresponds to the first radio and a second radio operational mode 510b that corresponds to the second radio. The network access system state diagram 500 may also comprise a first network state 520a that corresponds to the first network, a second network state 520b that corresponds to the second network, and a combined network state 520c that corresponds to the combination of the first access network and second access network. Additionally, the network access system state diagram 500 may comprise a first single radio interface state 521a and a first multiple radio interface state 524a that each correspond to the first interface, and a second single radio interface state 521b and a second multiple radio interface state 524b that each correspond to the second interface.

The first radio and second radio may each be configured to use a plurality of operational modes to communicate via the first interface and second interface, respectively, as shown in the first radio operational mode 510a and second radio operational mode 510b. The operational modes for the first radio and the second radio may have different power consumption requirements and may be based on the first access network standards and the second access network standards, respectively. The operational modes of each of the first radio and second radio may be selected to improve power conservation and meet the applications' requirements, as described above. In FIG. 5, the first access network is an IEEE 802.11 network and the second access network may be an IEEE 802.16 network. Accordingly, the operational modes of the first radio may be based on the 802.11 standard, such as in service (for active data traffic), PSM, extended PSM, and/or off. Similarly, the operational modes of the second radio may be based on the 802.16 standard, such as in service, sleep classes one, two, or three, idle, and/or off. In an embodiment, the operational modes of the first radio and second radio may be configured and/or selected using the methods and tables described herein.

The state of the UE over the first interface or second interface may change, as shown in the first single radio interface state 521a and second single radio interface state 521b. Specifically, the state of the UE may be based on the operational mode of the radios. Typically, if the UE communicates only with the first network over the first interface or with the second network over the second interface, the UE may either be in a reachable or non-reachable (NR) state upon paging or connection request from an application depending on whether the radio is in the first radio operational mode 510a or the second radio operational mode 510b, and hence meets the response time requirements of the application. For example in the first radio, the response time in the in-service operational mode may be fast enough for the UE to be reachable. The response time in the PSM operational mode may be fast enough to be reachable for some applications, but not for other applications so that the UE is reachable for some applications and is non-reachable for other applications. A similar result may occur when the UE is in the PSM operational mode and the UE is outside the service area of the first network. In the extended PSM operational mode, the UE may also be reachable and non-reachable in similar manner to those of the PSM operational mode. In the off operational mode, the UE is non-reachable. Hence, the UE may be in a reachable state via the first interface for an application when the first radio is in the in-service, PSM or extended PSM operational modes (as shown in the first single radio interface state 521a) if the response time of that operational mode meets the requirements of that application. Alternately, the UE may be in a non-reachable state via the first interface towards an application when the radio is in the PSM or extended PSM operational modes if the response time of that operational mode does not meet the requirements of that application, when the radio is outside the service area of the second network, or when the radio is in the off operational mode. Similarly, the UE may be reachable via the second interface towards an application when the second radio is in the in service, sleep class 1, sleep class 2, sleep class 3, or idle operational modes (as shown in the second single radio interface state 521b) if the response time of that operational mode meets the requirements of the application. Alternately, the UE may be in a non-reachable state via the second interface towards an application when the radio is in the sleep class 1, sleep class 2, sleep class 3, or idle operational modes if the response time of that operational mode does not meet the requirements of that application, when the radio is outside the service area of the second network, or when the radio is in the off operational mode.

In the case of multiple interfaces for the UE, the UE may have an additional state for each interface in comparison to the case of single interface communications. The additional state for each interface may be based on the combination of the state for each of the established interfaces. For instance, the UE may have directly reachable state based on the operational modes of the first radio and second radio individually, as shown in the first multiple radio interface state 524a and second multiple radio interface state 524b, provided the response time T-response(I,J) meets the requirement T(A) of the application A. By direct, it is meant that the UE may be reachable through an intended interface, as opposed to being reachable through another interface, as described herein. Additionally, the UE may be reachable towards connection requests to the first interface even if the UE is not directly reachable at the first interface but the UE may become reachable towards such connection requests after first being paged via the second interface. This new type of reachability is called reachable via another interface (e.g. reachable via paging through another interface), as shown in the first multiple radio interface state 524a. For example, the UE may be, towards connection requests to the first interface, reachable in the multiple radio interface state even if the first radio is NR in the single radio interface state but the second radio is reachable in the single radio interface state provided the response time T-response(I,J,i,j) meets the requirement T(A) of the application A. Similarly, the GE may be, towards connection requests to the second interface, reachable in the multiple radio interface state even if the second radio is NR in the single radio interface state but the first radio is reachable in the single radio interface state, as shown in the second multiple radio interface state 524b, provided the response time T-response(I,J,i,j) meets the requirement T(A) of the application A. However, when the UE is not reachable in the single interface state at both the first and second interfaces, the UE is in the NR state, as shown in the first multiple radio interface state 524a and second multiple radio interface state 524b.

The state of the UE to the first access network (e.g. the IEEE 802.11 network) and second access network (e.g. the IEEE 802.16 network) may correspond to the state of the UE at both the first interface or second interface, as shown in the first network state 520a and second network state 520b. Hence, the state of the UE to the first access network and second access network may be based on the combination of operational modes of the first radio and second radio. For instance, the UE may be reachable directly by the first network as shown in the first network state 520a if the LTE is reachable directly at the first interface, e.g. the first radio is reachable directly in the multiple radio interface state shown in 524a. Alternatively, the UE may be reachable by the first network via another network, e.g. the second network, if its first interface is not reachable directly but through paging via the second interface, e.g. the first radio is reachable via another interface in the multiple radio interface state 524a. Similarly, the UE may be reachable directly by the second network as shown in the second network state 520b if its second interface is reachable directly in the multiple radio interface state shown in 524b. Alternatively, the UE may be reachable by the second network via the first network, if its second interface is not reachable directly but through paging via the first interface. However, if the UE is not reachable via both the first and second interfaces, the UE may be in the NR state.

The state for both the first network and second network may be combined to obtain a combined state, as shown in the combined network state 520c. For instance, the UE may be reachable by the entire network access system, e.g. by any of the access networks, if the UE is reachable via the first interface and/or the second interface, as shown in the combined network state 520c. Alternatively, the UE may not be reachable by the system if the UE is not reachable via both the first interface and second interface. For example, the UE may be reachable by the system if the UE is by the first network and/or second network, e.g. is reachable either directly or via another network. Alternatively, the UE may not be reachable by the system if the UE is not reachable by both the first network and second network.

In the first network state 520a, second network state 520b, combined network state 520c, multiple radio interface states 524a and 524b, first single radio interface state 521a, and second single radio interface state 521b, whether the UE is reachable is relative to the response time of an application. The response times of these reachable states are derived from those of the radio operational modes and their combinations, i.e., T-response(I,J) and T-response(I,J,i,j). The power optimization is therefore according to what applications that the UE is expected to serve. Given one particular network application that one network (e.g., the first network) of the UE is required to be reached and the response time requirements, the UE may be configured with first network reachable at that response time either directly or via paging from second network. These network state configurations translate to the multiple interface state with the first interface being reachable at that response time either directly or via paging the second interface. Each of these multiple interface states at that response time again translates to multiple possibilities of single radio interface states: the ones with first interface reachable or the ones with first interface not reachable but second interface reachable so that the first interface may become reachable by paging via the second interface. Again, the concept of being reachable is respect to a certain maximum response time. Now, each of these single interface states of being reachable or non-reachable at certain maximum response times may be realized by different radio operational modes with different response times. In an embodiment, the optimization process is to choose the combinations of radio operational modes such that the combined power consumption of both radios is the smallest.

Figure 6:
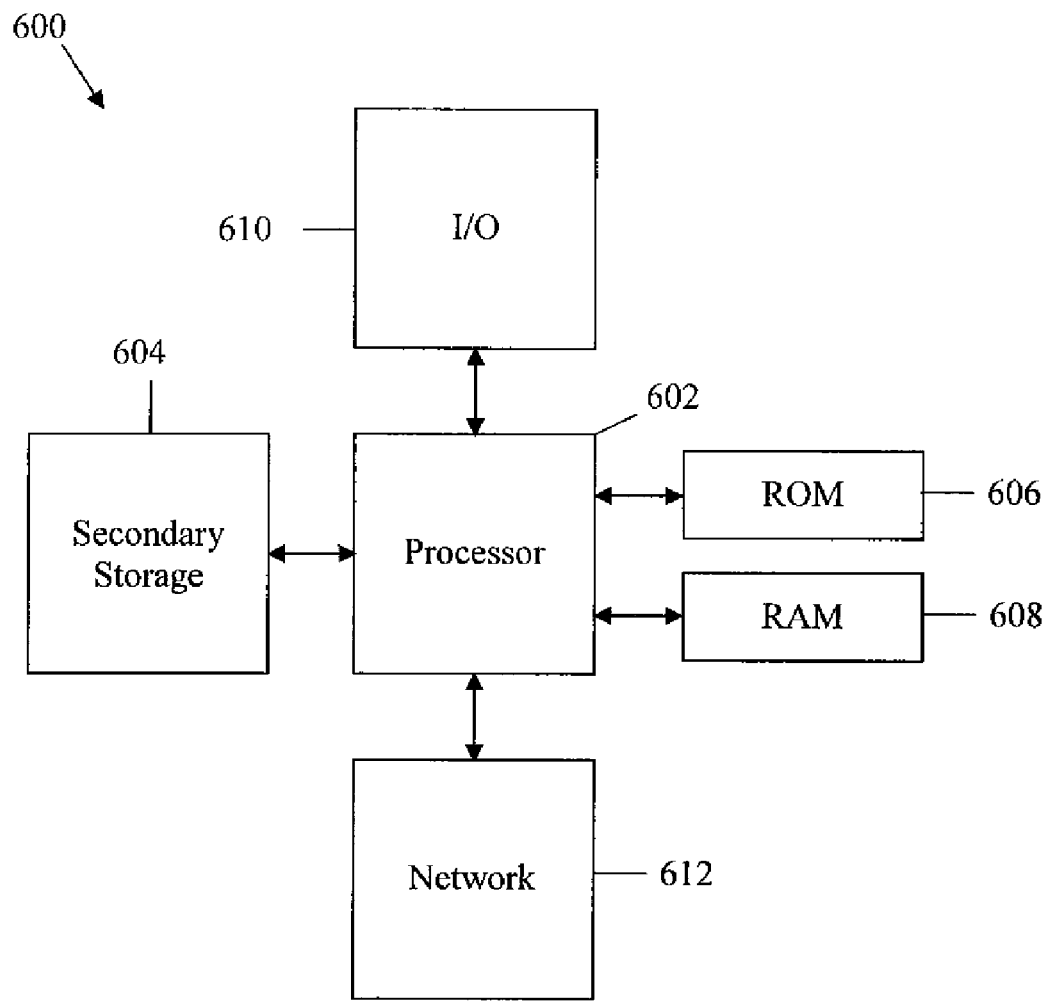
FIG. 6 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 6 illustrates a typical, general-purpose network component 600 suitable for implementing one or more embodiments of the components disclosed herein. The network component 600 includes a processor 602 (which may be referred to as a central processor unit or CPU) that is in communication with memory devices including secondary storage 604, read only memory (ROM) 606, random access memory (RAM) 608, input/output (I/O) devices 610, and network connectivity devices 612. The processor 602 may be implemented as one or more CPU chips, or may be part of one or more application specific integrated circuits (ASICs).

The secondary storage 604 is typically comprised of one or more disk drives or tape drives and is used for non-volatile storage of data and as an over-flow data storage device if RAM 608 is not large enough to hold all working data. Secondary storage 604 may be used to store programs that are loaded into RAM 608 when such programs are selected for execution. The ROM 606 is used to store instructions and perhaps data that are read during program execution. ROM 606 is a non-volatile memory device that typically has a small memory capacity relative to the larger memory capacity of secondary storage 604. The RAM 608 is used to store volatile data and perhaps to store instructions. Access to both ROM 606 and RAM 608 is typically faster than to secondary storage 604.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 5, 4, etc.; greater than 0.10 includes 0.11, 0.12, 0.15, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 5 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A wireless communication device comprising:
 a power supply;
 a first interface coupled to the power supply and associated with a first operational mode and a second operational mode, wherein the first interface is configured to couple to a first access network; and
 a second interface coupled to the power supply and associated with a third operational mode, wherein the second interface is configured to couple to a second access network,
 wherein the wireless communication device is associated with an application having a response time requirement for initiating communication over the first access network or the second access network,
 wherein the first operational mode does not meets the response time requirement via the first interface,
 wherein the second operational mode meets the response time requirement via the first interface,
 wherein the third operational mode meets the response time requirement via the second interface, and
 wherein the wireless communication device is configured to consume less power using the first operational mode and the third operational mode than when using the second operational mode.

2. The wireless communication device of claim 1, wherein the first operational mode is associated with a first response time, wherein the application is associated with a second response time, and wherein the first operational mode meets the first response time requirement when the first response time is less than or equal to the second response time.

3. The wireless communication device of claim 2, wherein the first response time is calculated using a mathematical equation T-response(I,J)=T-page(I,J)+T0-handshake(I,J), where T-response(I,J) is the first response time, T-page(I,J) is a page time that is needed to send a request via the first interface to initialize the first application, T0-handshake(I,J) is a handshake time that is needed to initialize the first application via the first interface, I indicates the first interface, and J indicates the first operational mode.

4. The wireless communication device of claim 2, wherein the first response time is calculated using a first mathematical equation T-response(I,J,i,j)=T-page(I,J)+T0-handshake(I,J,i,j), where T-response(I,J,i,j) is the first response time, T-page (I,J) is a page time that is needed to send a request via the first interface to initialize the second application, T1-handshake (I,J,i,j) is a handshake time that is needed to initialize the second application via the second interface when paged via the first interface, I indicates the first interface, J indicates the first operational mode, i indicates the second interface, and j indicates the second operational mode.

5. The wireless communication device of claim 2, wherein the first response time is approximated using a second mathematical equation T-response(I,J,i,j)≈T-page(I,J)+T0-handshake(i,j), where T-response(I,J,i,j) is the first response time, T-page(I,J) is a page time that is needed to send a request via the first interface to initialize the second application, T1-handshake(i,j) is a handshake time that is needed to initialize the second application via the second interface when paged via the second interface, I indicates the first interface, J indicates the first operational mode, i indicates the second interface, and j indicates the second operational mode.

6. The wireless communication device of claim 1 further comprising a table comprising a list of the applications or a plurality of application categories associated with each interface, a response time associated with each application or application category, the operational modes associated with each interface, the operational modes associated with the applications or the application categories, a response time for each operational mode, and a plurality of relationships between the response times of the applications and the response times of the operational modes.

7. The wireless communication device of claim 1, wherein the second interface is configured to listen for a page on behalf of the first interface.

8. The wireless communication device of claim 1, wherein the operational modes comprise at least one of three operational modes selected from a group consisting of in service, power saving mode (PSM), extended PSM, sleep, idle, and off.

9. The wireless communication device of claim 1, wherein the first operational mode is sleep, idle, or off, the second operational mode is in service, power saving mode (PSM), or extended PSM, and the third operational mode is service, PSM, or extended PSM.

10. The wireless communication device of claim 1, wherein the wireless communication device is configured to use the first operational mode and the third operational mode without using the second operational mode.

11. A wireless communication device comprising:
at least one processor configured to:
associate a plurality of operational modes for a plurality of interfaces with a plurality of applications supported by the interfaces based on the response times for initiating conmmunication over corresponding access networks and associated with the operational modes and the applications, wherein each of the plurality of interfaces is configured to couple to a corresponding one of the access networks;
receive a request to initialize a first one of the applications via a first one of the interfaces; and
select, for the first interface, a first one of the operational modes that is associated with the first application and that has less response time and consumes less power than at least some of the other operational modes associated with the first application.

12. The wireless communication device of claim 11, wherein the operational modes are associated with the applications when the response times associated with the operational modes are less than or equal to the response times associated with the applications.

13. The wireless communication device of claim 11, wherein the at least one processor is further configured to:
receive the operational modes and the response times associated with the operational modes; and
receive a plurality of power consumption requirements that correspond to the operational modes.

14. The wireless communication device of claim 13, wherein the at least one process is further configured to:
select one of the operational modes that consumes less power than at least some of the other operational modes; and
select one of the operational modes that has less response time than at least some of the operational modes.

15. The wireless communication device of claim 11, wherein the at least one processor is further configured to transmit the operational modes for the interfaces and the applications associated with the operational modes to a wireless device.

16. The wireless communication device of claim 11, wherein the at least one processor is further configured to:
initialize the application via the interface when a response time associated with an operational mode for the interface is less than or equal to the response time associated with the application; and
respond to the request according to an error response option when the response time associated with the operational mode for the interface is greater than the response time associated with the application.

17. The wireless communication device of claim 16, wherein the error message option comprises sending an error message, sending a message to wait and paging the interface, or dropping the request.

18. A method comprising:
determining a state for wireless device having a first interface associated with a first operational mode and a second operational mode, and a third operational mode associated with a second interface,
wherein the first interface is configured to couple to a first access network,
wherein the second interface is configured to couple to a second access network,
wherein the wireless device is associated with an application having a response time requirement for initiating communication over the first access network or the second access network,
wherein the first operational mode does not meets the response time requirement via the first interface,
wherein the second operational mode meets the response time requirement via the first interface,
wherein the third operational mode meets the response time requirement via the second interface,
wherein the wireless device is configured to use the first operational mode and the third operational mode without using the second operational mode.

19. The method of claim 18, wherein the wireless device is configured to consume less power using the first operational mode and the third operational mode than when using the second operational mode.

20. The method of claim 18, wherein the operational modes comprise at least one of three operational modes selected from a group consisting of in service, power saving mode (PSM), extended PSM, sleep, idle, and off.

21. The wireless communication device of claim 1, wherein the application is one of a cellular telephone service, a push-to-talk service, email, web browsing, streaming audio, and streaming video.

22. The wireless communication device of claim 1, wherein each of the first access network and the second access network is one of an Institute for Electrical and Electronic Engineers (IEEE) 802.11 network, a wireless Ethernet network, an IEEE 802.16 network, a Universal Mobile Telecommunications System (UMTS) network, a $3^{rd}$ Generation Partnership Project (3GPP) network, and a 3GPP2 network.

23. The wireless communication device of claim 11, wherein each of the plurality of applications is one of a cellular telephone service, a push-to-talk service, email, web browsing, streaming audio, and streaming video.

24. The wireless communication device of claim 11, wherein each of the plurality of access networks is one of an Institute for Electrical and Electronic Engineers (IEEE) 802.11 network, a wireless Ethernet network, an IEEE 802.16 network, a Universal Mobile Telecommunications System (UMTS) network, a $3^{rd}$ Generation Partnership Project (3GPP) network, and a 3GPP2 network.

25. The method of claim 18, wherein the application is one of a cellular telephone service, a push-to-talk service, email, web browsing, streaming audio, and streaming video.

26. The method of claim 18, wherein each of the first access network and the second access network is one of an Institute for Electrical and Electronic Engineers (IEEE) 802.11 network, a wireless Ethernet network, an IEEE 802.16 network, a Universal Mobile Telecommunications System (UMTS) network, a $3^{rd}$ Generation Partnership Project (3GPP) network, and a 3GPP2 network.

* * * * *